United States Patent [19]

Brown et al.

[11] Patent Number: 4,638,830

[45] Date of Patent: Jan. 27, 1987

[54] HIGH SENSITIVITY MAGNETIC ACTUATOR

[75] Inventors: Gregory C. Brown, Chaska; James L. Gravel, Prior Lake, both of Minn.

[73] Assignee: Rosemount Inc., Eden Prairie, Minn.

[21] Appl. No.: 781,358

[22] Filed: Sep. 27, 1985

[51] Int. Cl.[4] .......... G05D 16/00; F16K 31/08

[52] U.S. Cl. .......... 137/83; 251/129.08; 251/129.17; 251/129.02

[58] Field of Search .......... 137/83; 251/129.01, 251/129.02, 129.08, 129.15, 129.17, 65; 91/103 R, 103 M; 335/219, 229

[56] References Cited

U.S. PATENT DOCUMENTS

| | | | |
|---|---|---|---|
| 2,697,581 | 12/1954 | Ray | 251/129.17 X |
| 3,566,899 | 3/1971 | Bowditch | 92/103 M |
| 4,392,632 | 7/1983 | Gast | 251/65 |
| 4,559,971 | 12/1985 | Bradshaw | 251/65 X |

*Primary Examiner*—Alan Cohan

*Attorney, Agent, or Firm*—Kinney & Lange

[57] ABSTRACT

An improved magnetic actuator for providing mechanical actuation representative of an input current has a housing that supports a coil surrounding a central core, and includes a diaphragm type spring above the central core. A cover of high magnetic permeability is mounted on the housing spaced from the diaphragm spring. A permanent magnet is mounted on the diaphragm spring in a predetermined pole orientation and the magnet extends through an opening in the cover. The permanent magnet provides flux through the housing and the core. Sensitivity is increased by using the permanent magnet to provide a magnetic flux in addition to that created by currents in the coil. The magnet is oriented in relation to current flow in the coil so that the flux from the magnet will add to that generated by the coil in the gap between the pole face formed by the core and the spring and will subtract from the flux generated by the coil in the gap between the spring and the cover to provide a substantially linear deflection versus current relationship. The diaphragm spring is a sandwich of a pair of spider like spring discs having a thin layer of rubber between the plates to provide dampening to reduce sensitivity to vibration while aiding in providing linear operation.

10 Claims, 5 Drawing Figures

HIGH SENSITIVITY MAGNETIC ACTUATOR

BACKGROUND OF THE INVENTION

1. Field of the Invention.

The present invention relates to magnetic actuators where deflection of a member is a linear function with respect to an input current to the actuator.

2. Description of the Prior Art.

Magnetic actuators that provide a deflection as a function of electrical input signals are used in a variety of applications. A typical electrical signal to pressure signal transducer is shown in U.S. Pat. No. 4,534,376. The actuator of the present invention provides improvements to the actuator shown in FIG. 6 of this patent, and the preferred embodiment disclosed herein can be used for general applications where small displacements as a function of low input currents is desired.

In particular, it is desirable to have very low power levels developing the actuator forces and deflections. The amount of measurable deflection available in the small size actuator should be as much as possible (the working gaps should be large) to reduce manufacturing tolerance requirements and lower cost. The device of the present invention achieves these objectives.

U.S. Pat. No. 3,946,757 shows a pneumatic actuator used as the fuel metering valve that has a permanent magnet that establishes a magnetic flux across a gap, and a valve control armature is mounted for movement in the gap. The armature is pivotally mounted, and its lower portion is spring loaded to resist movement about the pivot. A coil is placed around a portion of the armature to create an actuating flux field that moves the armature as a function of the current in the coil. This device does show a coil that provides displacement of an armature positioned in a gap of a permanent magnet and the flux provided by the current in the coil adds to the permanent magnet flux on one side of the armature, and subtracts from the permanent magnet flux on the other side of the armature.

U.S. Pat. No. 3,004,546 shows an electromagnetic transducer which utilizes permanent magnets around a central body, and a coil that provides a magnetic flux in the central body that will add to the flux from the magnets in one direction, and subtract from the flux of the permanent magnet in an opposite direction of deflection. The actuator is a force balance, electropneumatic device and the actuation force is axially along the coil. The magnets do not provide for flux paths that are used with a deflecting diaphragm type spring as shown in the present disclosure.

U.S. Pat. No. 3,913,608 also shows a valve actuator that uses both permanent magnets and electromagnets for operation, but this device is intended to be a valve actuator unit having two valve positions, either open or closed, and there is no requirement that the current be proportional to the displacement of an a actuator as in the present device.

U.S. Pat. No. 4,018,419 also shows an on/off valve utilizing both permanent magnets (a magnetized valve rod) and a coil that moves the magentized rod and when the coil is not energized, the magnetized rod is moved to hold the valve open, while energization of the coil will close the valve.

U.S. Pat. No. 4,053,137 shows an electromechanically operated valve that has a valve member that is spring mounted, and which is actuated by an electromagnetic actuator responsive to current in a coil.

U.S. Pat. No. 4,306,589 shows a low power solenoid operated air valve with magnetic latching, that has a permanent magnet in the installation, as well as an electromagnet, which cooperate together for valve operation. The permanent magnet forms a valve member that is seated upon one or the other of two nozzles in response to the electromagnetic field.

U.S. Pat. No. 3,216,938 also shows a solonoid actuated valve device utilizing both a permanent magnet and an electromagnet for operation. The device does control a flow of fluid in proportion to the electric current, and does not embody the arrangement utilizing a diaphragm type spring (although it has a coil spring) or the arrangement of the magnet and flux gaps used in the device of the present device.

U.S. Pat. No. 4,310,143 also shows an electrically controlled proportional valve for hydraulic applications, including means for establishing a static magnetic field within the valve body, and also an electromagnetic device for inducing a magnetic field within magnetizable portion of the valve member so that the induced magnetic field interacts with the static magnetic to position the valve member axially. The position is controlled as a function of the energization current of the electromagnetic device. This linear actuating spool has a coil centering spring, and controls fluid flow as a function of the current.

U.S. Pat. No. 4,428,558 also shows a proportional solenoid valve comprising a rotary magnet causing a rotational displacement within an angle of 180° in proportion to the current being supplied to the coil, with a torsion bar for dampening the rotation.

An on/off magnetically actuated pilot valve is shown in U.S. Pat. No. 4,366,944. This valve is used as an armature plate that is movable between two positions, one closing off fluid pressure and the other closing off the connections to drain. Spring bias is used for biasing the armature plate to one of the positions. Current in the coil moves the plate to the other position.

U.S. Pat. Nos. 3,878,504, and 4,285,054 relate to "geophones" which comprise an annular coil-mass and a permanent magnet assembly positioned inside the coil coil-mass with their longitudinal axis generally coinciding, and spring spiders are used for supporting the coil-mass. The permanent magnet, and the actuator core of the electromagnet are arranged such that the coil-mass is supported within the permanent magnet assembly for axial and rotational movement.

Dampening fluids are also provided in U.S. Pat. No. 3,878,504. The device does show diaphragm type spiders used as springs, but not the sandwich construction of the present device, nor do they show actuators positioned for movement as disclosed herein.

U.S. Pat. No. 4,206,749 shows a control system utilizing permanent magnet assemblies for actuation. A polarizing magnetic field is provided for actuating this device.

SUMMARY OF THE INVENTION

The present invention relates to a magnetic actuator for providing a displacement which is a linear function of an input current to a control coil, with a favorable size to sensitivity ratio. The actuator is primarily designed for use in a current to pressure converter where small size is important, and relatively low acuating forces are involved.

The actuator of the present invention comprises a housing that has a diaphragm type spring spaced from a pole face formed on a core in the center of a coil. A ferromagnetic material cover is put over the housing on the opposite side of the diaphragm type spring from the core, and the cover comprises a top pole. A permanent magnet is attached to the center of the diaphragm spring and passes through an opening in the cover plate comprising the top pole. A deflector is connected to the permanent magnet and is in a path of fluid flow and is held partially blocking flow by the spring. Flux generated by the permanent magnet, as well as the spring response, contribute to provide a linear movement of the deflector to move it out of the fluid path as coil current increases and movement is in part due to flux caused by the permanent magnet and the coil current being additive in one gap of the flux path, and opposing in another gap.

The diaphragm spring is preferably a spider spring made in a sandwich construction with a layer of silicon rubber between two thin magnetic material discs. Relatively large maximum displacements are achieved for a very small size, and because the gaps provided are fairly large the tolerances do not have to be held closely and assembly is easy. Because there is low mass of moving parts, the performance in vibrating enviroments is enhanced, and the dampening characteristics of the silicon rubber layer in the spring diaphragm also enhances operation in vibrating environments.

The device is low cost, and reliable, and provides linear displacement in relation to coil current even when the current and the displacements are both small.

DETAILED DESCRIPTION OF THE PREFERRED EMBODIMENTS

Figure 1:
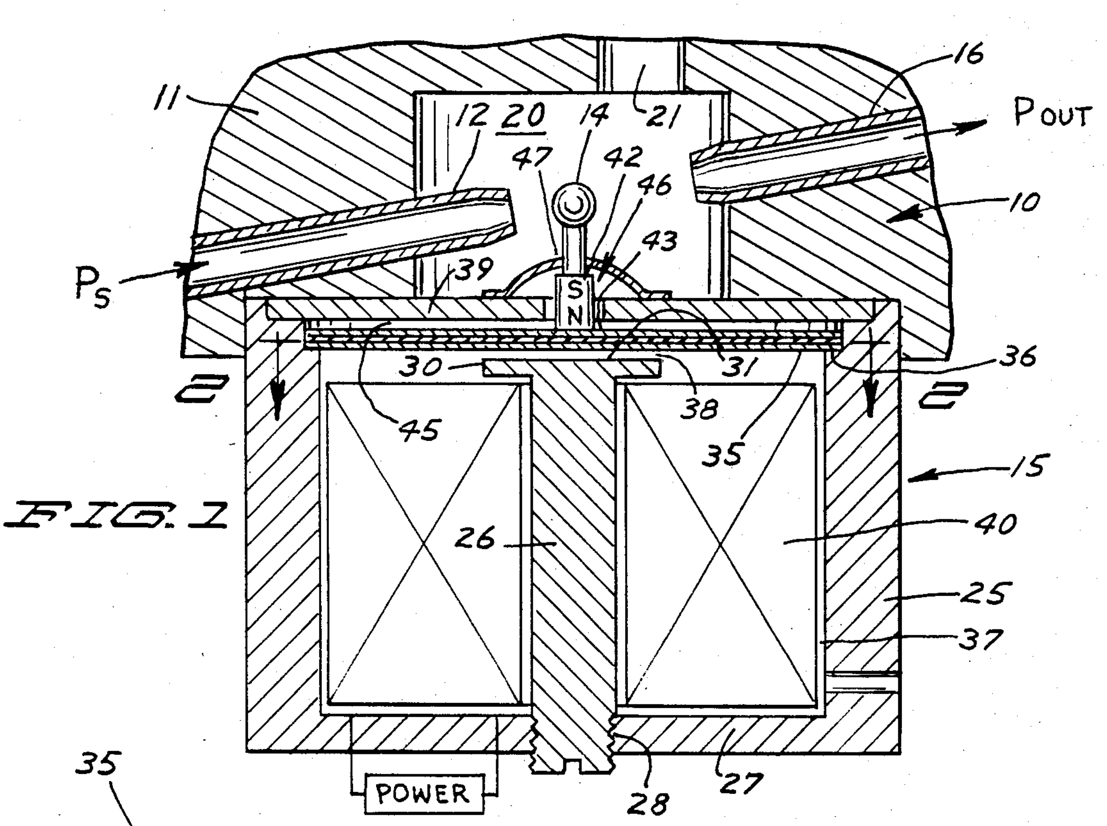
FIG. 1 is a vertical sectional view of an actuator made according to the present invention shown in place in a portion of a current to pressure converter.

FIG. 1 is a representation of a typical application of the actuator of the present invention, utilizing in particular the configuration shown in U.S. Pat. No. 4,534,376 to illustrate the use of the magnetic actuator in connection with an electrical signal to pressure signal transducer. The transducer shown generally at 10 comprises a nozzle 12, a deflector 14, and a receiver tube 16 enclosed in a cap 11. A magnetic actuator module 15 is made according to the present invention is installed in the cap 11.

In the actuator made according to the present invention, the deflector 14 comprises a mechanical actuator that is lifted or retracted to control flow from the pressure supply $P_2$, provided through nozzle 12 and passing to receiver 16. Both the nozzle 12 and receiver 16 are open to a chamber 20 that is formed in the cap 11, and chamber 20 has an outlet or exhaust port 21, as shown. The output pressure labeled $P_{out}$ from the receiver 16 depends on the position of the deflector 14. As shown, the deflector 14 is a round cross sectional area rod that extends laterally into the fluid stream as explained in U.S. Pat. No. 4,534,376. The nozzle and receiver 16 are offset from the center axis of the actuator as shown in dotted lines in FIG. 2 for illustrative purposes. The deflector 14 is moved to block or deflect flow when the actuator is not energized and will be retracted to increase the output to receiver 16 as a function of current.

In the disclosed form of the invention, the magnetic actuator 15 includes a housing 25 of ferromagnetic material, that as shown is cup-shaped and which has a central core member 26 mounted in a lower or first end wall 27 of the housing. The core member 26 comprises a cylindrical shank of ferromagnetic material that is threaded as at 28 at a first end into the lower wall 27 for adjustment purposes. The lower end of the shank of core 26 has a screw driver slot for adjustment. The second or upper end of the core 26 has a flat head 30 having a pole face 31 thereon facing toward the open end of housing 25.

A diaphragm type spring 35 is mounted on a suitable shoulder 36 formed on the housing 25, and the spring extends laterally across to overlie a central cavity 37 in the housing. The diaphragm spring 35 is a ferromagnetic material sandwich construction as will be explained. The lower surface of the diaphragm spring 35 forms a gap 38 with respect to the pole face 31 of core 26. A cover 39 of soft ferromagnetic permeability is mounted over the open end of the housing and forms a second end plate spaced from the diaphragm spring 35 to form a second gap 45 between the top surface of the diaphragm spring 35 and the inner surface of cover wall 39. The cover 39 is substantially parallel to pole face 31.

The core 26 is mounted in the central cavity 37 of the housing and is surrounded by a suitable electrical coil 40 in a conventional manner. The coil is positioned below the head 30, and when energized with a current through leads it will provide magnetomotive force represented by magnetic flux in a flux path defined by the core 26, the diaphragm spring 35, the cover 39 and the housing 25. The pole face 31 on core 26 extends out beyond a first end of the coil 40. A second end of core 26 is in low reluctance contact with the lower end wall plate 27 of the housing 25.

The diaphragm spring 35 has a permanent magnet (for example an ALNICO 8 magnet) 42 mounted on the upper surface thereof and in a predetermined orientation, with the magnet north pole face flat against the upper surface 43 of the diaphragm spring 35. The magnet south pole face is used for mounting the deflector 14, so that the deflector 14 is supported by the diaphragm spring 35. The soft magnetic material cover 39 has a central opening 46 through which the magnet 42 passes, so the south pole of magnet 42 and the actuator 14 are on the exterior of the housing 25 and the north pole of magnet 42 is on the interior of the housing 25. A suitable flexible shield or shroud 47 can be provided and sealed on the deflector 14 and around its edges to the cover 39 to surround the opening 46 to prevent contamination of the interior of the magnetic actuator housing 25.

The cover 39 comprises a second end plate the cooperates to provide for flux paths both when there is current in the coil 40 and when there is no current in the coil.

Figure 2:
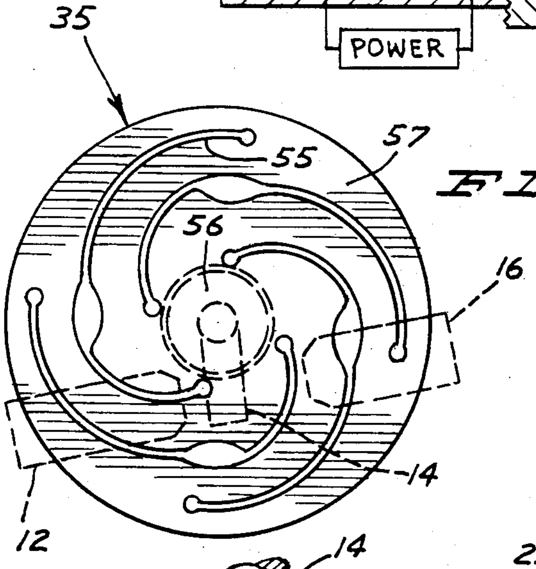
FIG. 2 is a plan view of a typical spider type diaphragm spring taken along line 2—2 in FIG. 1.
Figure 3:
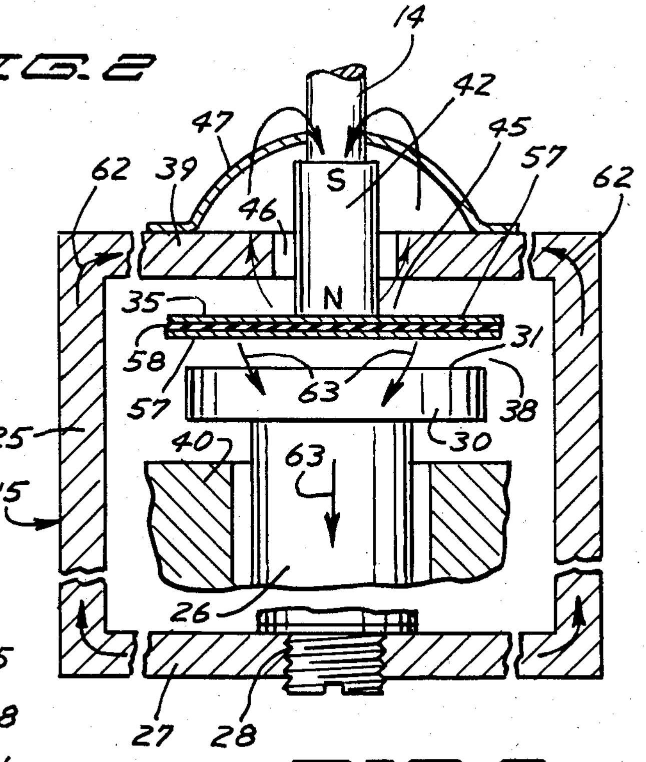
FIG. 3 is an enlarged cross sectional view of the pole faces in the center portions of FIG. 1 to show the details of construction, with parts in section and parts broken away and illustrating flux paths created by a permanent magnet.
Figure 4:
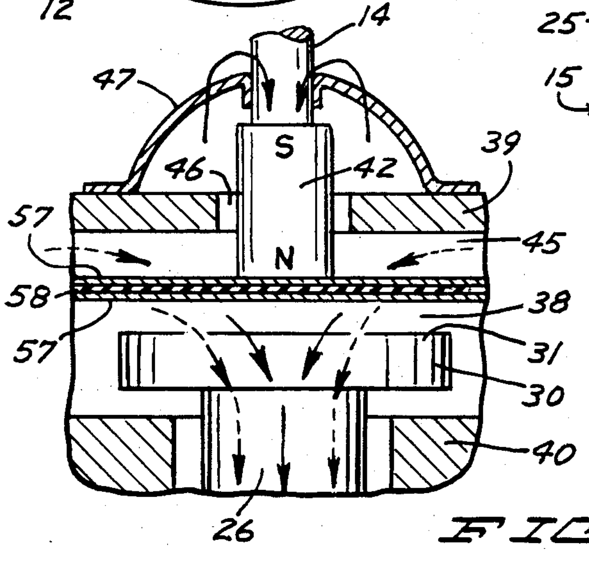
FIG. 4 is a view similar to FIG. 3 showing flux paths resulting from current in the coil.

The diaphragm spring 35 is made up in a sandwich type construction. There are two flat spider disc springs of a suitable metal magnetic material, as shown in FIG. 2, that each have scroll like grooves indicated at 55 therein leading from the center portion 56 where the permanent magnet 42 attaches, and extending spirally outwardly toward the outer edges. This provides for a spring action by the material strip between the adjacent spiral grooves. The diaphragm springs 35 includes two of the flat discs 57 with a layer of suitable silicone rubber 58 between and bonded to the discs 57 as shown in FIGS. 3 and 4. The discs 57 are relatively thin and the amount of rubber can be selected to obtain the desired spring characteristics. The rubber layer provides dampening, to reduce sensitivity to vibration. The outer rim of the diaphragm spring is held on the housing 25 in a suitable manner and provides the necessary spring rate to the deflecting center portion for the amount of deflection that is needed.

With no current flowing in the coil 40, as shown schematically in FIG. 3, the flux from the north and south poles of the permanent magnet 42 flows generally as shown by the arrows in the gap 45, there is a flux moving toward the south pole, and also flux passes through the cover 39 and the housing 25 as shown by the arrows 62 and through the core 26 and head 30 having pole 31 as shown by arrows 63. The flux in core 26 passes across the gap 38 through spring 35 from the north pole of magnet 42.

When current is provided to the coil 40, the current induced flux paths adjacent head 30 of core 26 are shown by the dotted line arrows in FIG. 4, and it can be seen that these current induced flux paths are such that the current induced flux adds to the flux from permanent magnet 42 in the gap 38 and subtracts from the flux provided by the permanent magnet 42 in gap 45 above the diaphragm spring 35. The gap 38 is the largest gap when the diaphragm spring is at rest and represents limit of movement of the actuator.

The result is that the deflection characteristics of the diaphragm spring 35, and thus the deflector 14 are altered so that the spring rate, the flux from the current in the coil 40, and the flux from the permanent magnets cooperate to provide for a linear deflection in relation to coil current, across the range of motion needed for the deflector 14.

With no coil current, the forces from the diaphragm spring acting upwardly are balanced by the forces acting downwardly (gravity etc.) when the diaphragm spring is near or touching the cover 39 forming the top pole piece. This fixes the position with the permanent magnet installed, and would give maximum spacing for gap 38 between the bottom surface of the diaphragm spring 35 and the surface 31 of the pole piece or core 26. This gap is the travel permitted for actuation in response to current in the coil to control the flow from the nozzle 12 to the receiver 16. The amount of air being transmitted to the receiver (pressure out) then is a function of the retraction of the deflector member 14 downwardly as shown in FIG. 1 as current in the coil 40 increases.

The linear relationship of this deflection relative to the coil current gives precise current to pressure control in that the pressure out of the receiver 16 is then a known function of the current energizing the coil 40.

The moving parts are quite low in mass, giving good performance in vibrating environments. The dampening characteristics of the silicon rubber layer in the sandwich construction of the diaphragm spring also aids operation where vibration is present. Relatively large working gaps are possible, so that tolerances can be obtained within reasonable working limits. Eddy currents are not a problem in the operation. The unit also has a very favorable size to sensitivity ratio, in that the units are quite small, for example the housing 25 may be in the range of one inch diameter.

The magnetic gaps are quite easily sealed from the pneumatic environment in chamber 20 through the use of a flexible shroud 47, so that contaminants are excluded from the moving actuator portions. The spring action also provides a built-in fail safe feature for the magnetic actuator when the current to coil 40 is interrupted, in that the diaphragm spring will move the deflector 14 to its "up" position where minimum pressure is provided at the output receiver tube 16. It should be noted that no bearings are necessary to obtain the linear deflection in relation to coil current, and the design is very simply made, with no complex mountings or parts.

It should be noted that the sandwich construction for the diaphragm spring can have the ferromagnetic spring discs made in different thicknesses from one another and of different alloys to obtain desired flux transmission characteristics. The sandwich construction does provide the dampening. As can be noted in FIG. 2, the spiral grooves can be widend in their mid portions if desired to aid in good bonding to the rubber layer between the discs.

Figure 5:
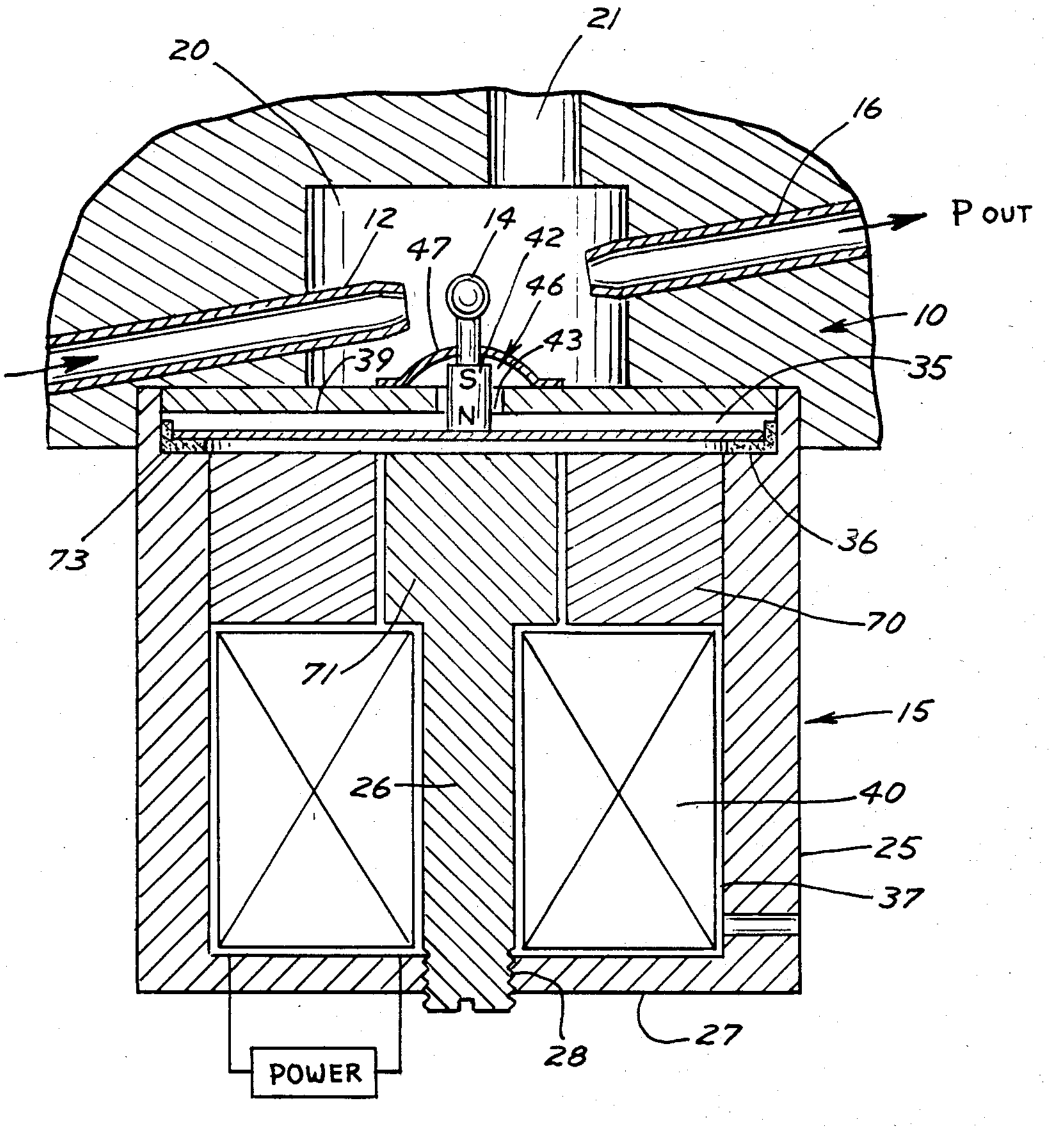
FIG. 5 is a vertical sectional view of an alternate embodiment of an actuator made according to the present invention shown in place in a portion of a current to pressure converter.

FIG. 5 is a representation of an application of an alternate embodiment of the invention in a current to pressure converter application. In FIG. 5, reference numerals that are the same as the reference numerals used in Figure 1 identify parts that are similar. In FIG. 5, however, a flat head 71 and a housing 25 have been extended vertically to receive a toroidal washer 70 between the housing and the head. The toroidal washer 70 is formed of a conductive nonmagnetic material, such as brass or aluminum, and provides damping due to eddy currents flowing in the washer. Spider spring 35 is formed of a single layer of magnetic material, such as nickel plated carbon steel and is shaped as shown in FIG. 2. Spider spring 35 is bonded to rim 36 of housing 25 with a resilient bonding material 73 which provides additional damping to spider spring 35. The resilient bonding material is preferably a room temperature vulcanizing rubber, such as General Electric Company's RTV Brand silicone rubber. In the actuator shown in FIG. 5, damping provided by the toroidal washer 70 eliminates the need for a multi-layer construction as shown in FIG. 3.

In certain applications, such as in a current to pressure transducer, it is desirable to operate the actuator from a 4–20 mA control loop with as little voltage applied to the transducer as 7 volts. The current available to power the actuator may be as little as mA and an actuator as described herein is particulary useful for such a lower power application.

Although the present invention has been described with reference to preferred embodiments, workers skilled in the art will recognize that changes may be made in form and detail without departing from the spirit and scope of the invention.

What is claimed is:

1. A magnetic actuator for providing a mechanical actuation representative of an input current comprising:

a coil extending from a first end to a second end along a central axis and having an inner diameter about the central axis for producing a magnetomotive force in response to an input current;

a ferromagnetic core having first and second ends and positioned in the interior of the coil and having a pole face extending outwardly from the first end of the coil;

a housing formed of ferromagnetic material disposed around the coil and core, said housing having a first end plate in low reluctance contact with the second end of the core and a second end plate spaced from the pole face of the core, said second end plate having an aperture therethrough aligned with the pole face;

a diaphragm spring formed of a ferromagnetic material having an outer rim fastened to the housing and a central region, overlying the pole face and spaced from the second end plate and the pole face in a rest position, the central region of said diaphragm spring being deflectable proportional to the input current toward and away from the pole face; and a permanent magnet mounted on the central region of the diaphragm spring and extending through the aperture in the second end plate, said permanent magnet being aligned along the central axis, a first permanent magnet pole face engaging the diaphragm spring on a side thereof opposite the pole face of the core, and a second permanent magnet pole face extending outside the housing.

2. The magnetic actuator of claim 1 wherein the diaphragm spring comprises a sandwich construction having at least one ferromagnetic disc bonded to a layer of elastomeric material.

3. The magnetic actuator of claim 2 wherein the elastomeric material comprises a silicone rubber.

4. The magnetic actuator of claim 2 wherein the sandwich construction comprises a pair of ferromagnetic discs with the layer of elastomeric material bonded between the discs.

5. The magnetic actuator of claim 1 wherein said core is adjustably mounted along the longitudinal axis with respect to the first end plate of the housing.

6. The magnetic actuator of claim 1, in combination with a pneumatic apparatus comprising a fluid flow device, and a deflector mounted on said permanent magnet and extending into the path of fluid flow of the fluid flow device, the amount of extension of the deflector into the fluid flow path being a function of the position of the diaphragm spring relative to the pole face of the core.

7. The magnetic actuator of claim 1 wherein the permanent magnet pole faces are oriented so that the flux from the permanent magnet and the flux formed by current in the coil add to each other in the core and across the gap between the core and the diaphragm spring, and subtract in the gap above the diaphragm spring.

8. A magnetic actuator for providing a linear movement representative of an input current comprising:

a housing;

a electromagnet formed in the housing and having a core with a pole face;

a diaphragm spring mounted on the housing and overlying and spaced from the pole face, said diaphragm spring being resiliently deflectable toward the pole face from a rest position;

an end wall on said housing overlying the diaphragm spring and having a hole therethrough; and a permanent magnet mounted with one pole face fixed to the diaphragm spring in alignment with the core and on an opposite side of the diaphragm spring from the core, said magnet extending through the hole, said housing, end wall, diaphragm spring and core being of magnetic material to carry magnetic flux, current in said coil acting to induce magnetic flux that adds to the flux from the permanent magnet tending to move the diaphragm spring toward the pole face.

9. A magnetic actuator as recited in claim 8 further comprising a ring formed of an electrically conductive material disposed in the housing for conducting an electrical eddy current to provide damping.

10. A magnetic actuator as recited in claim 8 wherein the diaphragm spring provides damping.

* * * * *